(12) United States Patent
Hegarty

(10) Patent No.: US 9,326,491 B1
(45) Date of Patent: May 3, 2016

(54) FLUID MISTING DETERRENT SYSTEM FOR BICYCLES

(71) Applicant: Harry E. Hegarty, Bellingham, WA (US)

(72) Inventor: Harry E. Hegarty, Bellingham, WA (US)

( * ) Notice: Subject to any disclaimer, the term of this patent is extended or adjusted under 35 U.S.C. 154(b) by 670 days.

(21) Appl. No.: 13/709,865

(22) Filed: Dec. 10, 2012

Related U.S. Application Data

(60) Provisional application No. 61/568,405, filed on Dec. 8, 2011.

(51) Int. Cl.
| | |
|---|---|
| *A62C 15/00* | (2006.01) |
| *B05B 9/08* | (2006.01) |
| *A01K 29/00* | (2006.01) |
| *B62J 11/00* | (2006.01) |
| *B62J 99/00* | (2009.01) |
| *A01K 15/02* | (2006.01) |

(52) U.S. Cl.
CPC ............... *A01K 29/00* (2013.01); *A01K 15/023* (2013.01); *B62J 11/00* (2013.01); *B62J 99/00* (2013.01); *B62J 2099/0086* (2013.01)

(58) Field of Classification Search
CPC .... A01K 15/023; A01M 29/00; A01M 29/12; B62J 99/00; B62J 11/00; B62J 2099/0086
USPC .......... 224/412–463; 239/154, 289, 172, 373, 239/159–170; 222/610; 280/288.4
See application file for complete search history.

(56) References Cited

U.S. PATENT DOCUMENTS

| | | | |
|---|---|---|---|
| 3,677,446 A | 7/1972 | Guyer, Jr. et al. | |
| 4,209,113 A | 6/1980 | Kuna | |
| 4,807,813 A | 2/1989 | Coleman | |
| 4,828,177 A | 5/1989 | Schuitemaker | |
| 4,911,339 A | 3/1990 | Cushing | |
| 5,009,192 A | 4/1991 | Burman | |
| 5,158,218 A | 10/1992 | Wery | |
| 5,501,179 A | 3/1996 | Cory | |
| 5,607,087 A | 3/1997 | Wery et al. | |
| D381,711 S | 7/1997 | Englert | |
| 5,735,440 A * | 4/1998 | Regalbuto | 222/610 |
| 5,755,368 A * | 5/1998 | Bekkedahl | 224/414 |
| 6,196,474 B1 | 3/2001 | Hillerson | |
| 6,722,679 B2 * | 4/2004 | Englert | 280/288.4 |
| 6,953,135 B2 | 10/2005 | Litton et al. | |
| 6,966,502 B2 * | 11/2005 | Wilt | A01M 7/0014 239/160 |
| 7,458,528 B2 * | 12/2008 | Ridgeway | B62J 99/00 180/53.8 |
| 8,714,464 B2 * | 5/2014 | Carrozza et al. | 239/333 |
| 2005/0145162 A1 | 7/2005 | Marcus | |
| 2009/0236815 A1 | 9/2009 | O'Toole | |
| 2013/0140377 A1 * | 6/2013 | Carrozza | B05B 15/061 239/172 |

\* cited by examiner

*Primary Examiner* — Len Tran
*Assistant Examiner* — Alexander Valvis
(74) *Attorney, Agent, or Firm* — Dwayne E. Rogge; Schacht Law Office, Inc.

(57) ABSTRACT

An animal and attacker deterrent system to be mounted to a bicycle or equivalent vehicle is disclosed herein. The deterrent system in one form included: a gas cylinder; a valve coupled to the gas cylinder and mounted to the bicycle; a gas conduit having a first end coupled to the user actuated valve; and at least one fluid reservoir coupled to a second end of the gas conduit; a plurality of mist producing spray apertures fluidly coupled to at least one of the fluid reservoir(s). The system as disclosed may include a plurality of reservoirs mounted to each of the left and right front fork components of the bicycle and having spray apertures mounted thereto. Alternatively, the system may include a plurality of spray apertures mounted at a single position and directed to mist fluid to left and right sides of the bicycle therefrom.

4 Claims, 5 Drawing Sheets

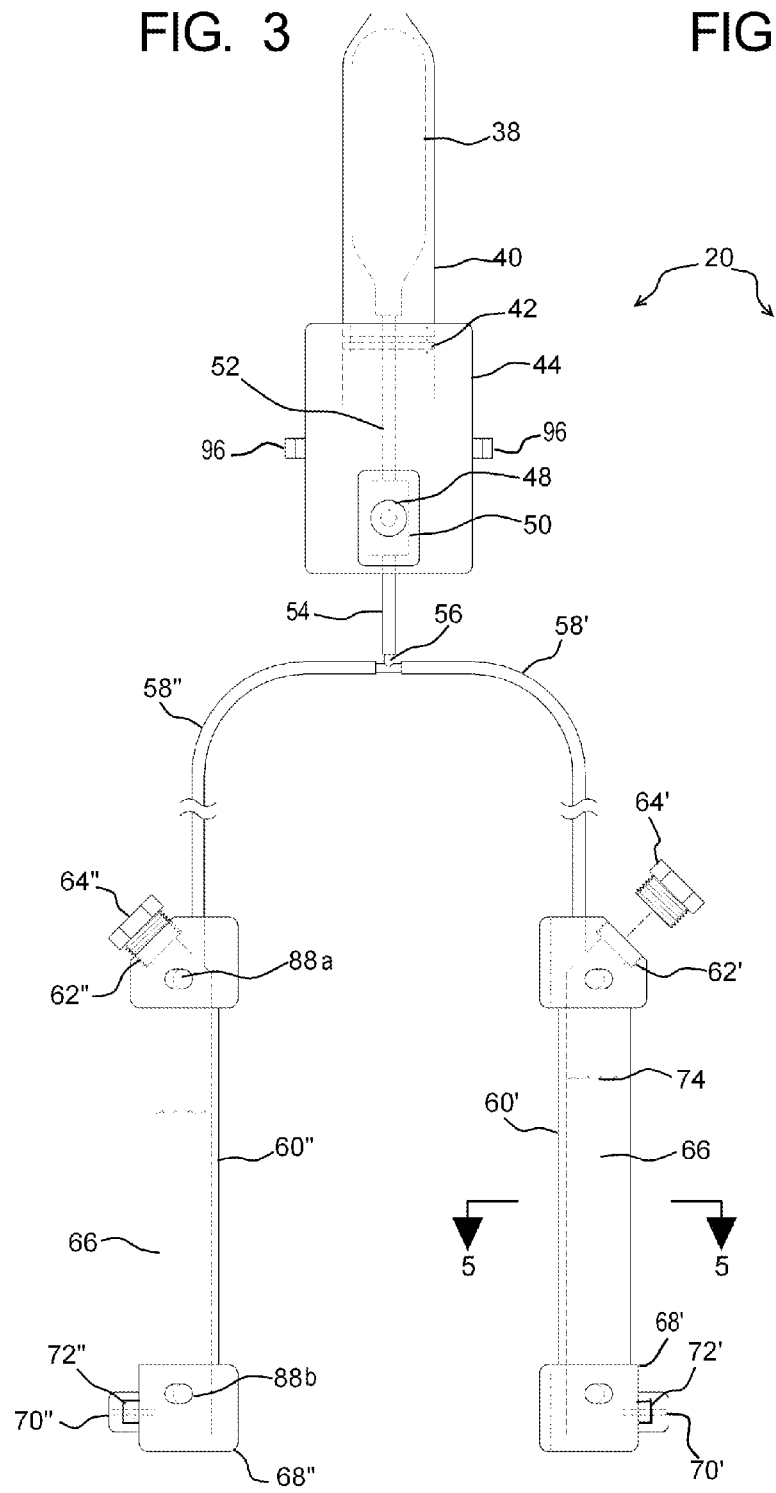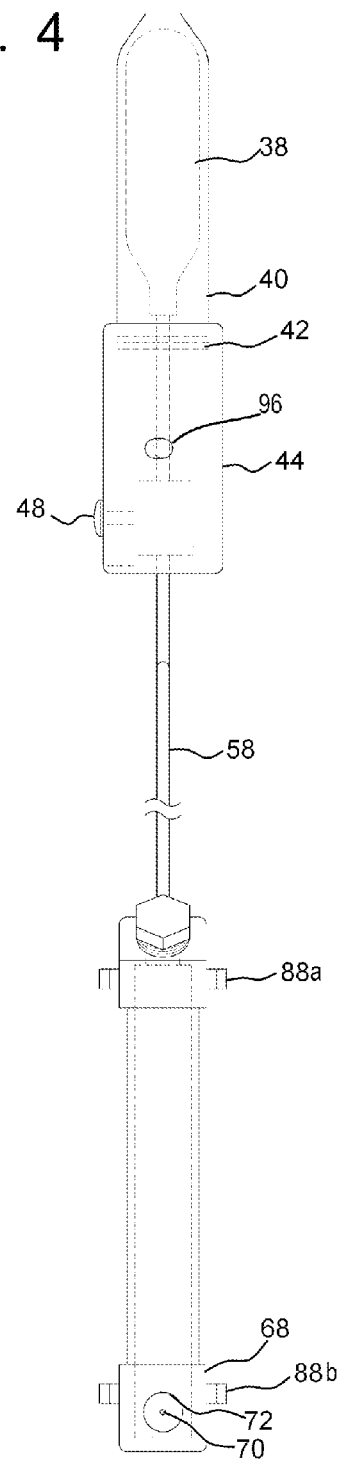

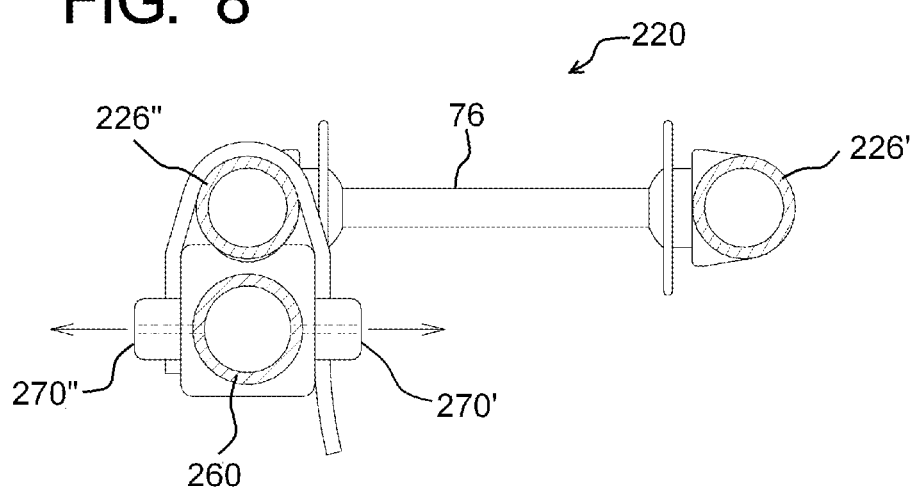

FLUID MISTING DETERRENT SYSTEM FOR BICYCLES

BACKGROUND OF THE DISCLOSURE a) Field of the Disclosure

This disclosure relates to the field of fluid misting device to be mounted to a bicycle or similar vehicle wherein the fluid misting device has a pressurized portion, and a user-actuated valve for release of the fluid through at least one misting orifice to produce a fine "cloud" of the animal deterrent fluid.

SUMMARY OF THE DISCLOSURE

An animal and attacker deterrent system to be mounted to a bicycle or equivalent vehicle is disclosed herein. The deterrent system comprises: a compressed gas cylinder; a user actuated valve coupled to the compressed gas cylinder and mounted to the bicycle adjacent the handlebars; a gas conduit having a first end coupled to the user actuated valve; and at least one fluid reservoir coupled to a second end of the gas conduit; a plurality of mist producing spray apertures fluidly coupled to at least one of the fluid reservoir(s); and the spray apertures are mounted to the bicycle.

The deterrent system as disclosed may comprise a plurality of fluid reservoirs mounted to each of the left and right front fork components of the bicycle and having spray apertures mounted thereto. Alternatively, the deterrent system may comprise a plurality of spray apertures mounted at a single position and directed to mist fluid to left and right sides of the bicycle therefrom.

To reduce leakage past the orifice, a check valve may be positioned between each spray aperture and its associated fluid reservoir. In this embodiment, the cracking pressure of the check valve is above the pressure exerted by the fluid within the system when the user actuated valve is closed.

The overall desired outcome is to provide a mist cloud between the user and any attacking animal, such that the animal will be deterred from attacking and will not injure the rider.

BRIEF DESCRIPTION OF THE DRAWINGS

FIG. 3 is a front view of one embodiment of the disclosure shown separately from the bicycle.

FIG. 4 is a side view of one embodiment of the disclosure shown separately from the bicycle.

FIG. 8 is a cutaway view of a slight variation similar to the view of FIG. 7 but using a single reservoir and misting orifice housing.

DESCRIPTION OF THE PREFERRED EMBODIMENTS

Anyone who has ridden a bicycle in rural or residential areas has very likely encountered animals, mainly dogs, which have approached the rider with the intent of chasing, barking at, biting, or otherwise confronting (attacking) the bicyclist. Not only does the animal attack often directly result in injury to the bicycle rider, but the situation also diverts the rider's attention away from the roadway and traffic and may exacerbate the situation in that the rider may drive off of the roadway, or into traffic, and significantly injure themselves. Several deterrent methods have been employed, including yelling at the animal, kicking at the animal, carrying pepper spray or other directionally projected fluid, or noises such as whistles, horns, or bells. Many of these methods are very inefficient and may not significantly deter the animal. Furthermore whistles, horns, pepper sprays may require that the rider be further distracted from the roadway, and particularly in the case of directed pepper sprays, require that the rider remove at least one hand from the handlebars to grab the spray, direct the device at the animal, and it triggered a mechanism. Pepper sprays also may be carried by the wind back toward the rider, causing pain, injury and further loss of attention. Thus a safe and efficient means for deterring animals while maintaining safety to the rider is greatly desired and as of yet has not been significantly achieved.

Additionally, devices have been created for spraying of the rider or otherwise providing a non-deterrent cooling or refreshing fluid to the rider. Obviously, such devices would generally not deter the attacking or chasing animal, or would at a minimum be additionally deterrent to the rider themself.

Figure 1:
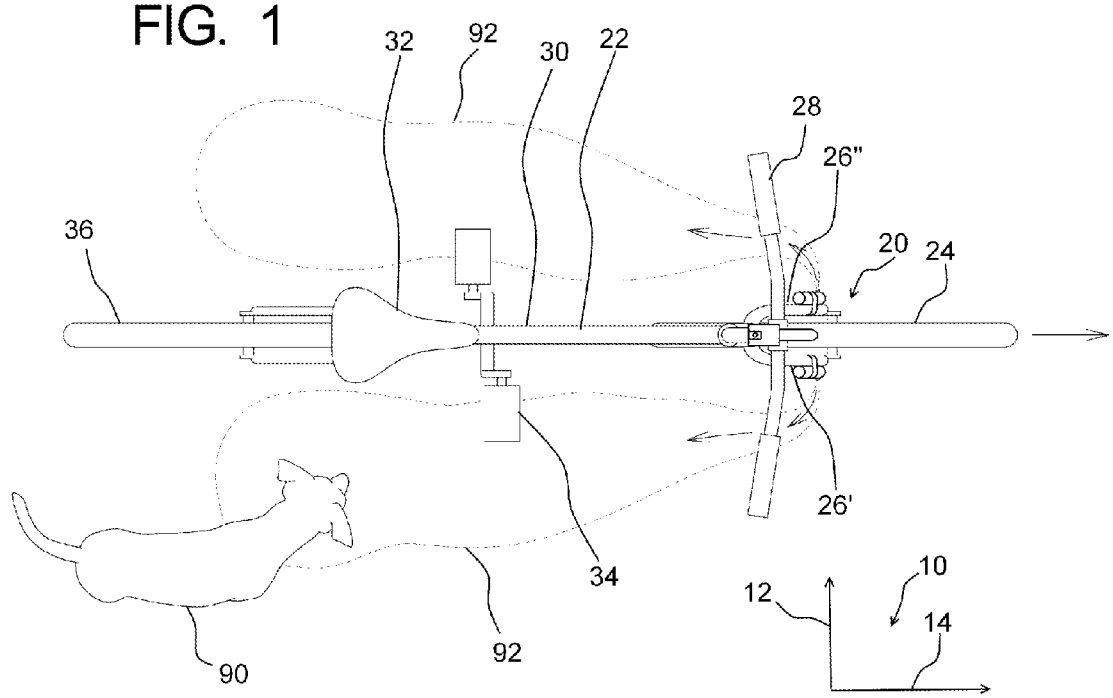
FIG. 1 is a top environmental view of one embodiment of the disclosure in use.
Figure 2:
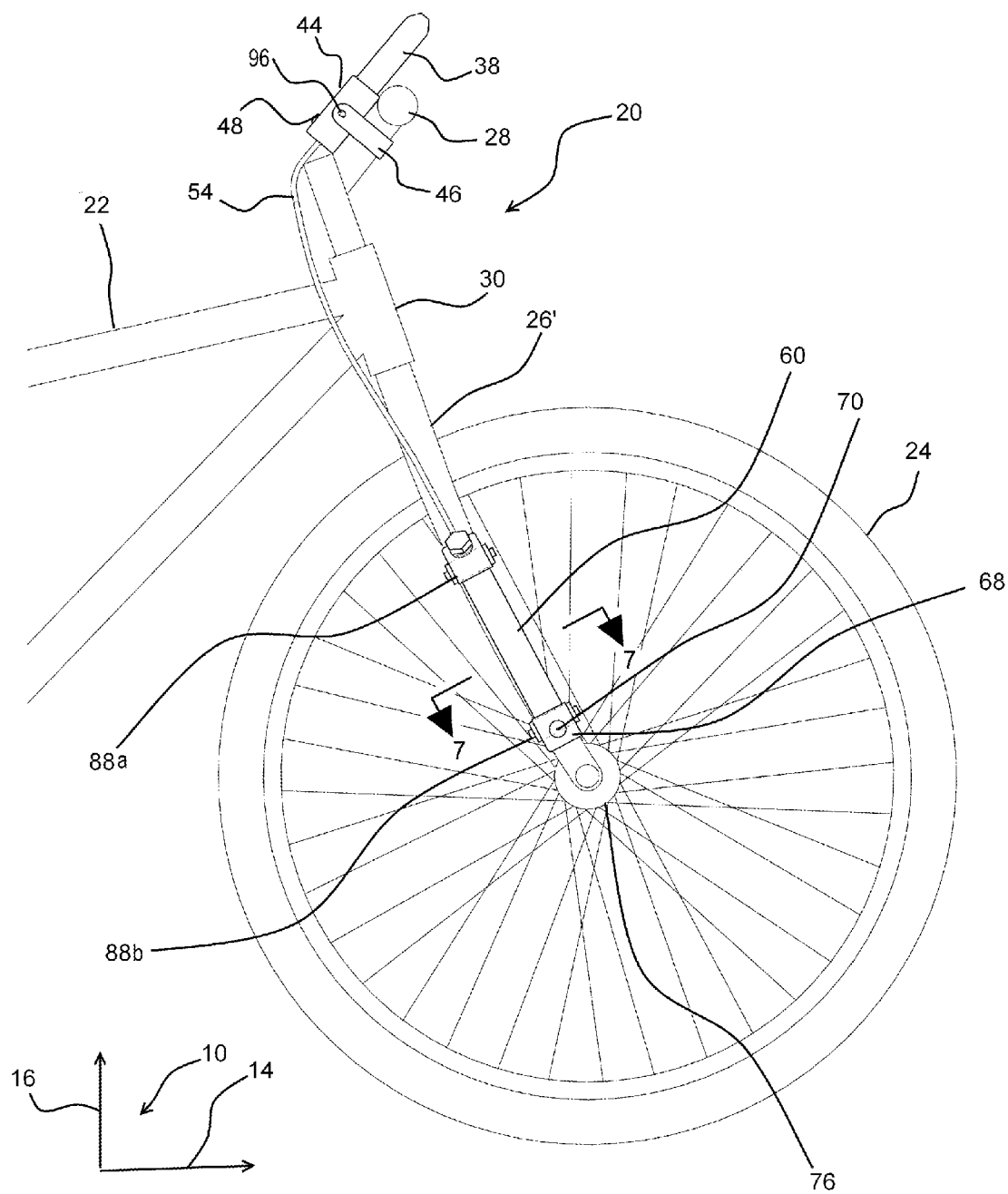
FIG. 2 is a side view of one embodiment of the disclosure attached to a bicycle.

Before beginning a detailed description of the device and a method for operating the device disclosed herein, an axes system 10 is shown in FIGS. 1 and 2 which generally comprises a transverse axes 12 and a longitudinal axis 14. In FIG. 2 the longitudinal axis 14 is shown along with a vertical axis 16 which is generally orthogonal to both the transverse axes 12 and longitudinal axis 14. In FIG. 1, the longitudinal axis of 14 generally points in a forward direction with the opposite direction being defined as reward direction, and the transverse axes 12 points in a leftward direction with the opposite direction being defined as a rightward direction. Similarly, the vertical axis 16, shown in FIG. 2 points in upward direction, with the opposite direction is generally defined as downward. These axes are intended for discussion only.

Additionally, a numbering system will be utilized wherein specific components use a single or double apostrophe to indicate for example right or left versions of a similar component. For Example, the reservoirs of FIG. 2 are generally denoted with the label 60, and as shown in FIG. 3 the right reservoir is labeled 60', and the left reservoir is labeled 60". A variation is shown in FIG. 8 where similar components use the same numeric identifier as the variation of FIG. 3 with a numeral "2" prefix. For example, the reservoir 260 of FIG. 8 is similar to the reservoirs 60 of FIG. 3.

Looking to FIG. 1, the deterrent system 20 is shown mounted to a bicycle 22. While the components of the bicycle are well-known several components will be pointed out here. Specifically, a front wheel 24 is mounted to the front forks 26 (where the left fork portion is indicated by 26" and the right fork is indicated by 26'). The front wheel 24 rotates about an axle 76 (axis) at the radial center of the wheel, where the front wheel attaches to the fork. Handlebars 28 are generally mounted through the frame 30 and control motion of the bicycle 22. Commonly, a seat 32 is also mounted to the frame 30 as are pedals 34 and a rear wheel 36. These components are well-known in the art and vary from bicycle to bicycle.

While the term bicycles used herein, the device can operate as well on other vehicles such as scooters, skateboards, tricycles, unicycles and the like. Larger motorized vehicles generally have the speed, power and in the case of enclosed vehicles, protective shell, where such a deterrent system may not be needed.

Looking to FIG. 2, the deterrent system 20 can be seen attached to the bicycle 22. Specifically, in one form the deterrent system 20 comprises a compressed gas cartridge 38 which may be as shown in FIGS. 3 and 4 contained within a housing 40. The housing 40 is threaded 42 are otherwise attached to an actuator/valve housing 44. The actuator/valve housing 44 is attached by way of a mounting strap 46 or other mechanism to the handlebars 28 or other part of the bicycle 22. Protrusions 96 may be provided on the housing 44 for attachment of the strap 46. The strap 46 may be similar or identical to the strap 80 (FIG. 6) described herein. In one form the mounting strap is elastic, and has surfaces defining voids there through for attachment to studs or projections of the housing 44. The actuator 48 (such as a push button) is easily within the reach of the user such that the user does not have to significantly remove their attention from the roadway to activate the actuator 48.

As can be seen in FIGS. 3 and 4, the actuator 48 in this embodiment is connected to a normally closed valve 50 which is fluidly connected by way of a conduit 52 to the compressed gas cartridge 38. When a compressed gas cartridge 38 is properly attached, pressure is provided to the valve 50 and when the valve 50 is opened, the compressed gas flows outward through conduit 54. In the embodiment shown in FIGS. 3 and 4, a tee 56 may be utilized to split the gas flow to a right conduit 58' and left conduit 58" which are in turn coupled to the associated reservoir 60' of 60" respectively.

The reservoirs 60 are at least partially filled through fill openings 62 with a deterrent fluid 66 such as water, water mixed with scents or chemicals such as ammonia, eucalyptus, peppermint, and citrus. Testing has shown that many dogs dislike the smell of citrus and will avoid a rider who has previously sprayed citrus towards them. Of course it will likely be desired to avoid chemicals which will damage the bicycle or environment or harm the rider such as bleach etc. A fill cap 64 may be provided to close and provide a pressure containing seal to the fill openings 62.

At the lower end of the reservoir 60 is provided a mister housing 68 (the term mister used to identify a spraying apparatus having a mister orifice 70).

Testing of the device in operation has shown that the apparatus in some embodiments benefits from the use of check valves 72 positioned between the reservoir 60 and the orifice 70. In operation, without the check valves or an equivalent device, when the fluid level 74 is above the orifice 70, the fluid may drain out by way of gravity.

Check valves are generally two-port valves, meaning they have two openings in the body, one for fluid to enter and the other for fluid to leave. There are various types of check valves used in a wide variety of applications. Although they are available in a wide range of sizes and costs, check valves generally are very small, simple, and/or inexpensive. Check valves work automatically and most are not controlled by a person or any external control; accordingly, most do not have any valve handle or stem. The bodies (external shells) of most check valves may be made of plastic or metal. An important concept in check valves is the cracking pressure which is the minimum upstream pressure at which the valve will operate. Typically the check valve is designed for and can therefore be specified for a specific cracking pressure. In the applications shown, it will generally be desired that the cracking pressure of the check valve be higher (larger) than the head pressure caused by the fluid 66 being vertically above the orifice 70. When the fluid level 74 is below the orifice 70, check valves may not be needed.

A variation is shown in FIG. 8 wherein a single reservoir 260 is utilized. In this variation, similar components use the same numeric identifier as previously described with a numeral "2" prefix. For example, the reservoir 260 of the variation is similar to the reservoirs 60 above. This apparatus is also attached to the bicycle near the front axle 76. In the variation shown, the reservoir 260 is attached at the left fork 226", but the device could just as easily be attached to the right fork 226'. In this embodiment, the left orifice 270" points away from the bicycle in the same way as the previous embodiment, but the right orifice 270' points toward the bicycle, in one form so as to direct a fluid spray through the spokes of the front wheel 24. As the orifice is providing a mist, rather than a directed spray, the mist contacting the spokes should not cause significant detriment.

Figure 5:
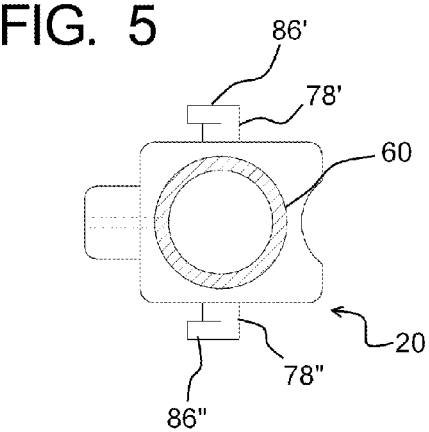
FIG. 5 is a cutaway view of one component taken along line 5-5 of FIG. 3 with several components removed to better show the structure of the remaining components.
Figure 6:
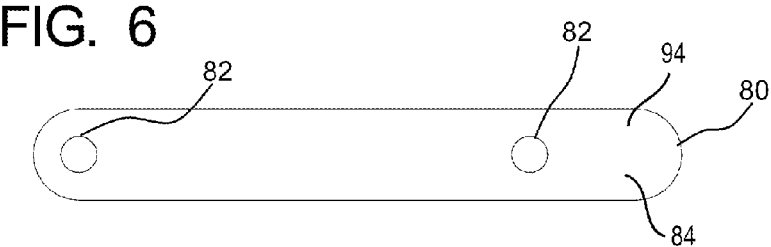
FIG. 6 is a plan view of one example of an elastic strap used to attach the apparatus to the bicycle.
Figure 7:
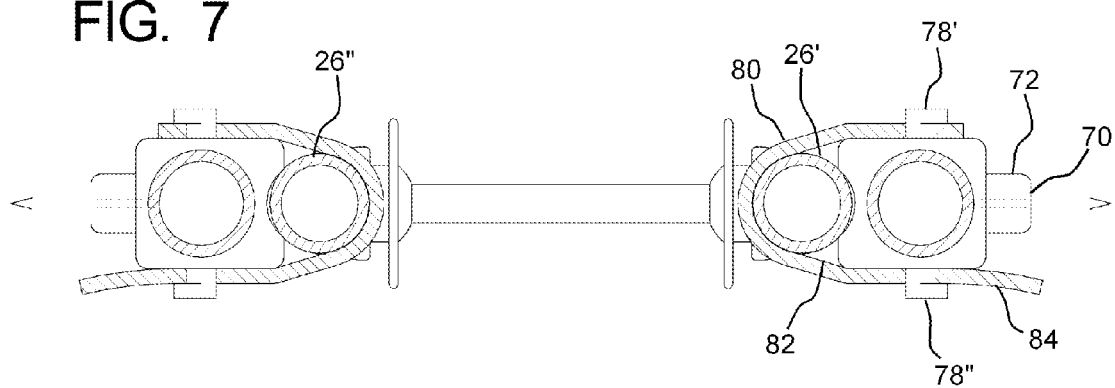
FIG. 7 is a cutaway view of one component taken along line 7-7 of FIG. 2 with several components removed to better show the structure of the remaining components.

While the device may be welded, glued, taped or otherwise attached at many different locations on the bicycle, one efficient mode of attaching each reservoir 60 and/or the actuator 48 and compressed gas cartridge 38 to the bicycle 22 is shown in FIGS. 5-7. In this embodiment, one or more protrusions 78 are provided on the component to be attached to the bicycle. A strap 80 having at least one surface defining a void 82 is attached to the component, by setting a protrusion 78' into a void 82, wrapping the strap around a portion of the bicycle, and then fixing a second void 82 around a second protrusion 78". The apparatus may also be attached by hook and loop fastening, or alternately by more permanent attachment such as adhesives, or fasteners. As shown in FIG. 7, the strap 80 may then be wrapped around a front fork 26, and then a second protrusion 78" is inserted in another void 82 in the strap 80 to secure the component to the bicycle. In one form, a rubber-like material is used for the strap. Such a rubber material not only stretches to provide additional securement to between the component and bicycle, but also may provide a non-slip surface on the inner surface 94 of the strap 80 to increase friction and reduce relative movement between the strap and the bicycle frame. To aid in installation, the strap 80 may be longer than needed, to provide a grasping portion 84 which extends beyond the protrusion 78". Such an extension makes attachment and removal much easier.

In one form as shown in FIG. 5, each protrusion 78 further may include a catch 86 extending radially therefrom. The catch 86 functions to retain the strap 80 on the protrusion 78.

While the strap as shown only has two voids 82, additional voids could easily be incorporated to allow attachment to other, larger, or smaller portions of the bicycle. Such as to be used as the strap 46 which as shown attaches to the handlebar stem of the bicycle. As the handlebar stem may be larger in diameter than the fork, a larger distance between voids 82 may be needed on the strap 80.

As shown in FIGS. 2, 3 and 4, attachment locations 88a, 88b may be provided at more than one position on the component to be attached to the bicycle. Such positions are provided to further resist movement of the component relative to the bicycle.

In operation, a user may mount the reservoir(s) 60, actuator 48, and compressed gas cartridge 38 to the bicycle where the actuator 48 is readily accessible to the user while riding the bicycle with their hands on the handlebars 28. As attacking animals 90 instinctively attack from the side, and from the rear as shown in FIG. 1, and generally not from the front, it is desired to for the user to continue riding forward as the animal 90 attacks. To deter the animal, as the animal approaches, the user engages the actuator 48, opening the valve 50, opening a conduit between the cartridge 38 and the reservoir(s) 60, providing pressure to the reservoir(s) 60 thus forcing a volume of fluid 66 past the check valve(s) 72 and through the orifice(s) 70 to provide the mist cloud(s) 92 shown. As it is not possible for the animal 90 to engage the user or bicycle 22 without passing through the cloud 92, the cloud 92 should deter the animal 90 in their attack. While a simple water cloud may be effective, the mist cloud 92 is especially deterrent when it is comprised of a scent, irritant, or other materials repellant to animals.

While the present invention is illustrated by description of several embodiments and while the illustrative embodiments are described in detail, it is not the intention of the applicants to restrict or in any way limit the scope of the appended claims to such detail. Additional advantages and modifications within the scope of the appended claims will readily appear to those sufficed in the art. The invention in its broader aspects is therefore not limited to the specific details, representative apparatus and methods, and illustrative examples shown and described. Accordingly, departures may be made from such details without departing from the spirit or scope of applicants' general concept.

I claim:

1. A deterrent system configured to be attached to a vehicle having handlebars, right and left forks on each side of a front wheel; the system comprising:
   a compressed gas cylinder attached to the vehicle at a first location;
   a user actuated valve coupled to the compressed gas cylinder and mounted to the vehicle adjacent the handlebars;
   a gas conduit having a first end coupled to the user actuated valve;
   at least one fluid reservoir coupled to a second end of the gas conduit;
   a first mist producing spray aperture and a second mist producing spray aperture fluidly coupled to at least one of the fluid reservoir(s);
   the first mist producing spray aperture configured to direct a fluid mist transversely left of the vehicle;
   the second mist producing spray aperture configured to simultaneously direct a fluid mist transversely right of the vehicle;
   the first and the second mist producing spray apertures mounted to the vehicle in a fixed orientation remote from the first location; and
   wherein the plurality of spray apertures are configured to be mounted at a single position.

2. The deterrent system as recited in claim 1 further comprising:
   a check valve positioned between each spray aperture and its associated fluid reservoir;
   wherein the cracking pressure of the check valve is above the pressure exerted by the fluid within the system when the user actuated valve is closed.

3. A deterrent system configured to be attached to a vehicle having handlebars, right and left forks on each side of a front wheel; the system comprising:
   a compressed gas cylinder attached to the vehicle at a first location;
   a user actuated valve coupled to the compressed gas cylinder and mounted to the vehicle adjacent the handlebars;
   a gas conduit having a first end coupled to the user actuated valve;
   at least one fluid reservoir coupled to a second end of the gas conduit;
   a first mist producing spray aperture and a second mist producing spray aperture fluidly coupled to at least one of the fluid reservoir(s);
   the first mist producing spray aperture configured to direct a fluid mist transversely left of the vehicle;
   the second mist producing spray aperture configured to simultaneously direct a fluid mist transversely right of the vehicle;
   the first and the second mist producing spray apertures mounted to the vehicle remote from the first location;
   a first fluid reservoir mounted to the left front fork of the vehicle;
     the first mist producing spray aperture mounted directly to the first fluid reservoir
     the first mist producing spray aperture configured to direct a fluid mist transversely left of the vehicle;
   a second fluid reservoir mounted to the right front fork of the vehicle;
     the second mist producing spray aperture mounted directly to the second fluid reservoir; and
     the second mist producing spray aperture configured to direct a fluid mist transversely right of the vehicle.

4. A deterrent system configured to be attached to a vehicle having handlebars, right and left forks on each side of a front wheel; the system comprising:
   a compressed gas cylinder attached to the vehicle at a first location;
   a user actuated valve coupled to the compressed gas cylinder and mounted to the vehicle adjacent the handlebars;
   a gas conduit having a first end coupled to the user actuated valve;
   at least one fluid reservoir coupled to a second end of the gas conduit;
   a first mist producing spray aperture and a second mist producing spray aperture fluidly coupled to at least one of the fluid reservoir(s);
   the first mist producing spray aperture configured to direct a fluid mist transversely left of the vehicle;
   the second mist producing spray aperture configured to simultaneously direct a fluid mist transversely right of the vehicle;
   the first and the second mist producing spray apertures mounted to the vehicle remote from the first location;
   the plurality of spray apertures are configured to be mounted at a single position;
   and directed to mist fluid to left and right transverse sides of the vehicle therefrom; and
   at least one of the spray apertures directs a mist fluid through the front wheel of the vehicle.

* * * * *